(12) United States Patent
Dinakaran et al.

(10) Patent No.: US 7,614,629 B2
(45) Date of Patent: Nov. 10, 2009

(54) KING PIN SUSPENSION MOUNT ADAPTER

(75) Inventors: Suresh Gingade Dinakaran, Troy, MI (US); Paula D. Somerville, Troy, MI (US); Robert Kosen, Shelby Township, MI (US); Richard E. Gady, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 300 days.

(21) Appl. No.: 11/545,022

(22) Filed: Oct. 6, 2006

(65) Prior Publication Data

US 2008/0084042 A1    Apr. 10, 2008

(51) Int. Cl.
B62D 7/18 (2006.01)
(52) U.S. Cl. .......................... 280/93.512; 280/124.154
(58) Field of Classification Search ............ 280/93.512, 280/124.154
See application file for complete search history.

(56) References Cited

U.S. PATENT DOCUMENTS

| | | | | |
|---|---|---|---|---|
| 2,756,067 A | * | 7/1956 | Porsche et al. ........ | 280/124.153 |
| 5,709,399 A | * | 1/1998 | Smith, Jr. ................ | 280/93.512 |
| 5,975,547 A | * | 11/1999 | Stroh et al. ............. | 280/93.512 |
| 6,027,130 A | * | 2/2000 | Kawabe et al. ......... | 280/124.135 |
| 6,367,830 B1 | * | 4/2002 | Annequin et al. ...... | 280/93.512 |
| 6,997,468 B2 | * | 2/2006 | Ziech et al. ............ | 280/93.512 |
| 7,093,843 B2 | * | 8/2006 | Varela et al. ........... | 280/93.512 |
| 2003/0075892 A1 | * | 4/2003 | Tisch et al. ............ | 280/93.512 |
| 2004/0188969 A1 | * | 9/2004 | Huhn et al. ............ | 280/93.512 |
| 2008/0018070 A1 | * | 1/2008 | Gottschalk ................. | 280/86.5 |

* cited by examiner

*Primary Examiner*—Paul N Dickson
*Assistant Examiner*—Drew Brown
(74) *Attorney, Agent, or Firm*—Carlson, Gaskey & Olds

(57) ABSTRACT

A king pin is used to couple a knuckle and axle housing together in a steer axle assembly. The king pin is fixed to the axle housing and the knuckle is supported for rotation relative to the king pin. The king pin includes a cylindrical body portion and a suspension mount portion formed about one end of the cylindrical body portion. A shock absorber is mounted to the suspension mount portion of the king pin.

23 Claims, 5 Drawing Sheets

KING PIN SUSPENSION MOUNT ADAPTER

TECHNICAL FIELD

The subject invention relates to a king pin that serves as a mount for a suspension component.

BACKGROUND OF THE INVENTION

A steer axle assembly for a heavy-duty vehicle includes a knuckle at each end of a laterally extending axle beam or housing. A king pin is used to couple each knuckle to the axle housing. A steering arm is mounted to one of the knuckles and receives steering input from a steering wheel. As the vehicle is steered, steering input from the steering arm rotates the associated spindle and wheel about the king pin.

Traditionally, the king pin is fixed to the knuckle and is rotatably mounted on the axle housing. In this mounting configuration, the king pin was able to rotate relative to the axle housing but the knuckle was not able to rotate relative to the king pin. Also, in a typical mounting configuration, suspension components such as shock absorbers, struts, and associated brackets, etc., are mounted on the axle housing to accommodate road load inputs. These suspension components are mounted to, or supported by, the axle housing via bearings and fasteners.

This traditional mounting configuration requires the shock absorber to be large enough to accommodate significant road load inputs for heavy duty applications. Thus, traditional shock absorbers for heavy-duty vehicles tend to be bulky and are difficult to package within a very limited amount of available space. Another disadvantage with this traditional mounting configuration is that, due to the inboard location of the shock absorber, the amount of wheel travel is limited. Further, this mounting configuration has a large moment arm on the axle housing, which undesirably increases the size of the axle housing.

Thus, there is a need for a suspension configuration that does not require the shock absorber to be mounted to the axle housing to provide greater wheel travel, and to allow for a more compact axle housing configuration.

SUMMARY OF THE INVENTION

A suspension component, such as a shock absorber for example, is mounted to a king pin that is coupled to an axle housing. This reduces a moment arm on the axle housing and allows a smaller axle housing to be used as compared to axle housings for a traditional shock absorber mounting configuration. Further, mounting the shock absorber to the king pin moves the shock absorber to a further outboard location than traditional mounting, which provides for greater wheel travel.

In one example configuration, the king pin has a cylindrical body portion with an upper end and a lower end. A center bore is formed within the cylindrical body portion and extends from the upper end to the lower end. An attachment member is received within the center bore, and is used to fix the king pin to an axle housing such that the king pin cannot rotate relative to the axle housing. The king pin is also mounted within a steering knuckle via a bushing or bearing element, such that the knuckle can rotate relative to the king pin.

A suspension mount portion is formed about the upper end of the cylindrical body portion. In one example, the suspension mount portion comprises an ear extension that extends transversely to the cylindrical body portion. The shock absorber is mounted directly to this ear extension. The shock absorber is prevented from rotating on its vertical axis during steering or when the knuckle is rotated about the king pin axis.

These and other features of the present invention can be best understood from the following specification and drawings, the following of which is a brief description.

DETAILED DESCRIPTION OF THE PREFERRED EMBODIMENT

Figure 1:
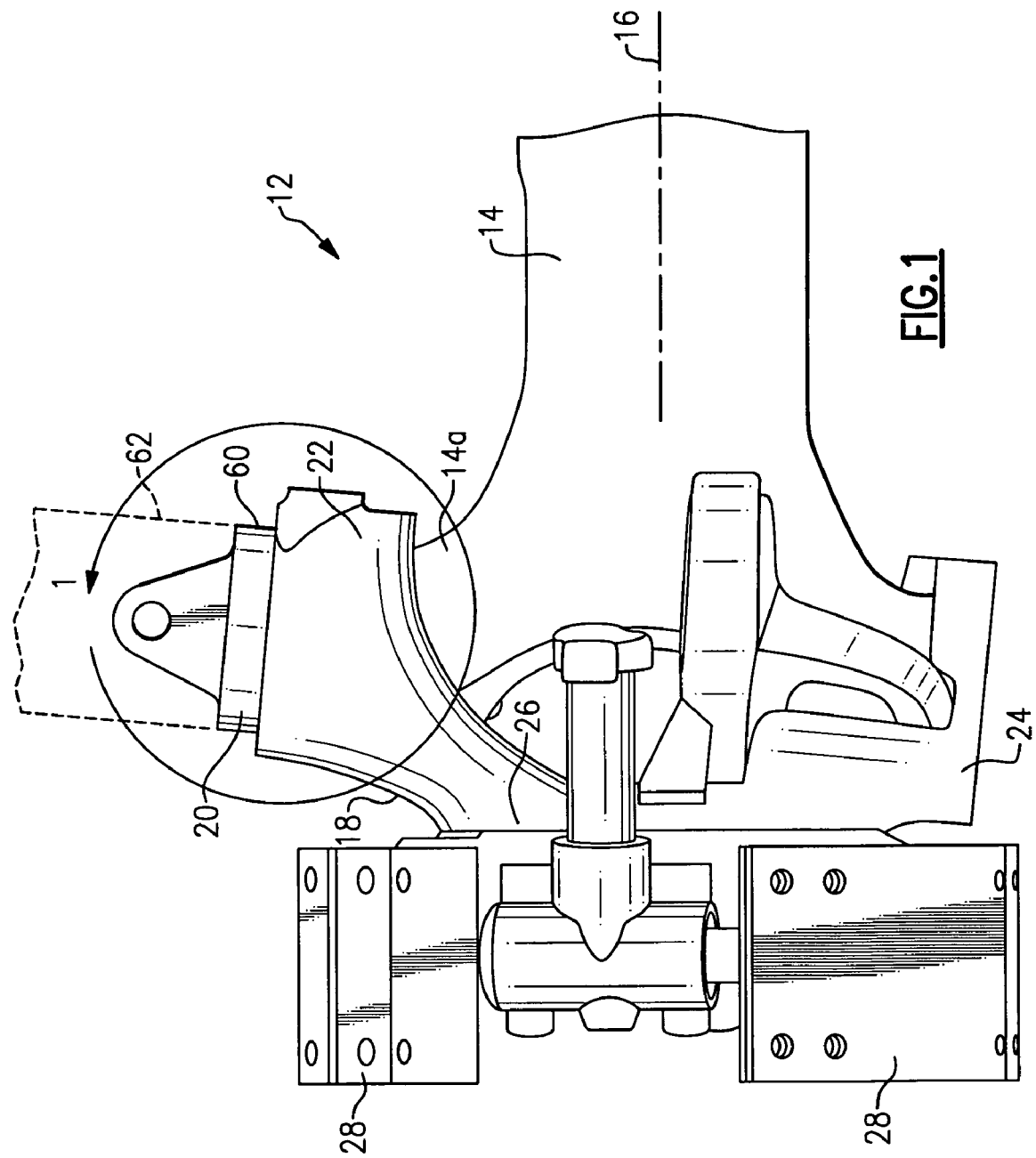
FIG. 1 is a perspective view of a knuckle and axle assembly incorporating the subject invention.

One end of a steer axle 12 is shown in FIG. 1, with an opposite end being similarly configured. The steer axle 12 includes a beam or axle housing 14 that defines a lateral axis 16 that extends between a pair of wheels (not shown). A knuckle 18 is connected to each end of the axle housing 14 with a king pin 20. The knuckle 18 includes an upper boss 22, a lower boss 24, and a spindle portion 26. The king pin 20 mounts the upper boss 22 of the knuckle 18 to the axle housing 14, and another king pin (not shown) is used to mount the lower boss 24 to the axle housing 14. An associated wheel hub and brake drum or rotor (not shown) is supported for rotation relative to the spindle portion 26 via bearings as known. Non-rotating brake components, such as the brake shoes 28, are supported by the spindle portion 26.

As a vehicle is steered, steering input from a steering arm (not shown), usually fixed to the upper boss 22 of the knuckle, rotates the associated knuckle and wheel about the king pin 20.

Figure 2:
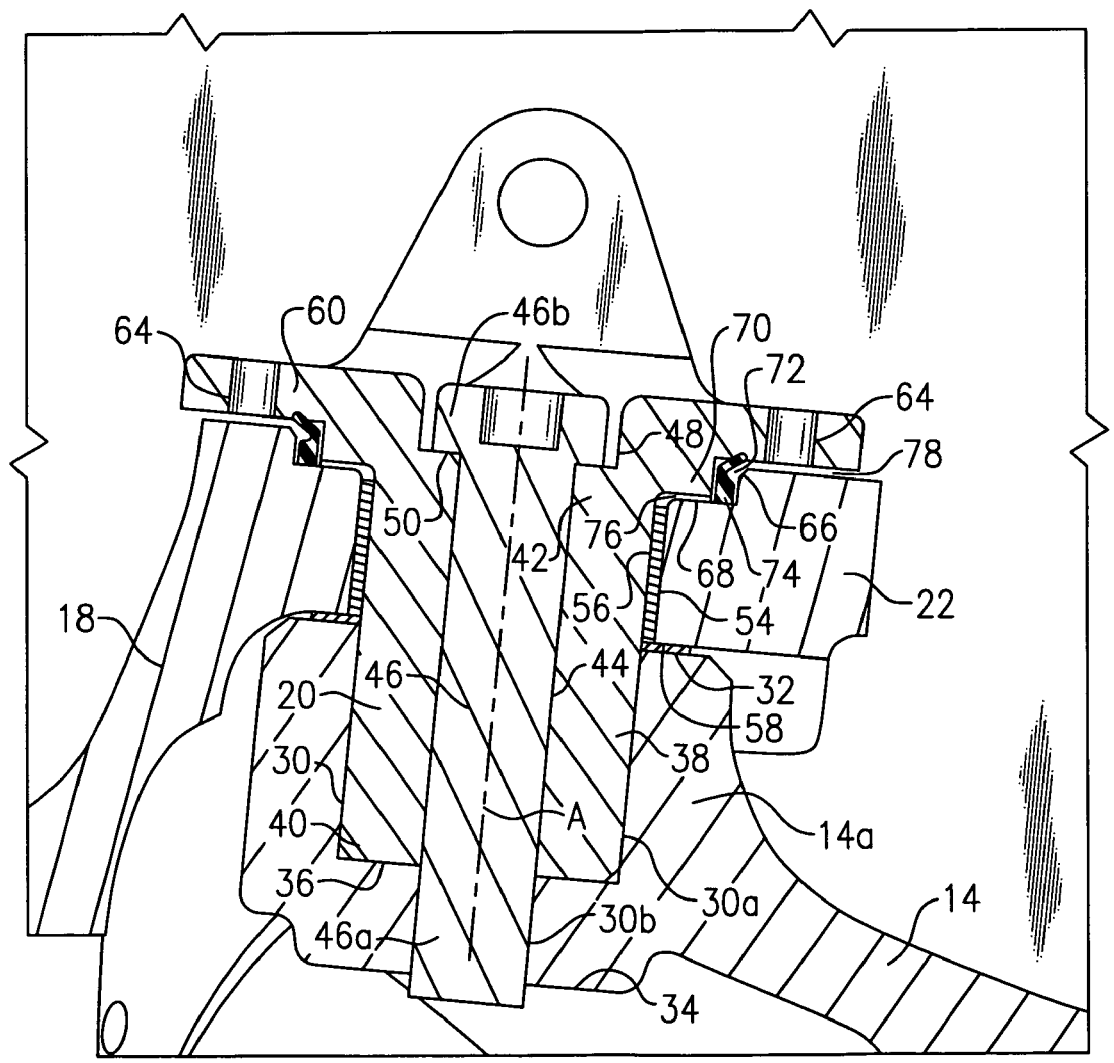
FIG. 2 is a cross-sectional view of a portion of the knuckle and axle assembly as identified in FIG. 1.

As shown in FIG. 2, the king pin 20 is received within the upper boss 22. The upper boss 22 is attached to an associated upper boss 14*a* of the axle housing 14. The upper boss 14*a* of the axle housing 14 includes a bore 30 that extends from an upper surface 32 to a lower surface 34. The bore 30 has a first portion 30*a* with a first diameter and a second portion 30*b* with a second diameter that is less than the first diameter. This forms a stop surface 36 within the upper boss 14*a* of the axle housing 14.

The king pin 20 includes a cylindrical body 38 having a lower end 40 and an upper end 42. The king pin 20 is pressed into the bore 30 in the upper boss 14*a* until the lower end 40 of the king pin 20 abuts against the stop surface 36.

The king pin 20 includes a central bore 44 that extends from the lower end 40 to the upper end 42. Once the king pin 20 has been pressed into the upper boss 14*a* of the axle housing 14, an attachment member 46 is inserted into the central bore 44. The attachment member 46 is used to secure the king pin 20 to the axle housing 14 such that the king pin 20 cannot rotate relative to the axle housing 14 about an axis A defined by the king pin 20.

In the example shown, the attachment member 46 comprises a threaded fastener. A distal end 46*a* of the threaded fastener is threaded into the second portion 30b of the bore 30 in the axle housing 14. The central bore 44 of the king pin 20 includes an enlarged diameter area 48 that forms a stop surface 50 that is engaged by a head portion 46b of the threaded fastener. The use of this type of mounting configuration tightly clamps and holds the king pin 20 fixed to the axle housing 14. While a threaded fastener is shown as an example, it should be understood that other types of attachment methods could also be used. Other examples of attachment methods include, but are not limited to: cap screw; locking dowel; draw pin; or a press fit.

The upper boss 22 of the knuckle 18 includes a knuckle bore 54. The knuckle bore 54 is concentric with the central bore 44 of the king pin 20 and the bore 30 of the axle housing 14. A bearing or bushing element 56 is pressed into the knuckle bore 54. The cylindrical body 38 of the king pin 20 is pressed into the bushing element 56 such that an exterior surface of the king pin 20 directly engages an inner surface of the bushing element 56. This allows the knuckle 18 to rotate relative to the king pin 20.

Another bearing element 58 is positioned between a lower end of the bushing element 56 and an upper surface of the upper boss 14a of the axle housing 14. This other bearing element 58 could comprise a thrust washer, and/or at least one shim, for example.

The king pin 20 includes a suspension mount portion 60 that is formed about the upper end 42 of the cylindrical body portion 38. The suspension mount portion 60 comprises an ear extension that extends transversely to the axis A defined by the cylindrical body 38 of the king pin 20. A suspension component is mounted directly to this ear extension.

In the example shown, the suspension component comprises a shock absorber 62 (FIG. 1). The suspension mount portion 60 includes apertures or openings 64 that allow the shock absorber 62 to be fixed directly to a top of the king pin 20.

The knuckle bore 54 includes an enlarged portion 66 that opens towards the top surface of the upper boss 22. This enlarged portion 66 defines a bottom surface 68. A step portion 70 of the king pin 20 is spaced apart from the bottom surface 68 by a gap 76. The step portion 70 is located axially between the suspension mount portion 60 and the cylindrical body 38, with the step portion 70 being defined by a diameter that is greater than an outermost diameter of the cylindrical body 38, but which is smaller than an outermost diameter of the suspension mount portion 60.

A recess 72 is formed between the enlarged portion 66 of the knuckle bore 54 and the step portion 70. The suspension mount portion 60 is spaced apart from the upper surface of the upper boss 22 by a gap 78. A seal 74 is mounted within this recess 72 to prevent debris and other external contaminants from interfering with the bushing element 56. The seal 74 abuts against the bottom surface 68. The seal 74 could also be mounted on step portion 70.

Figure 3:
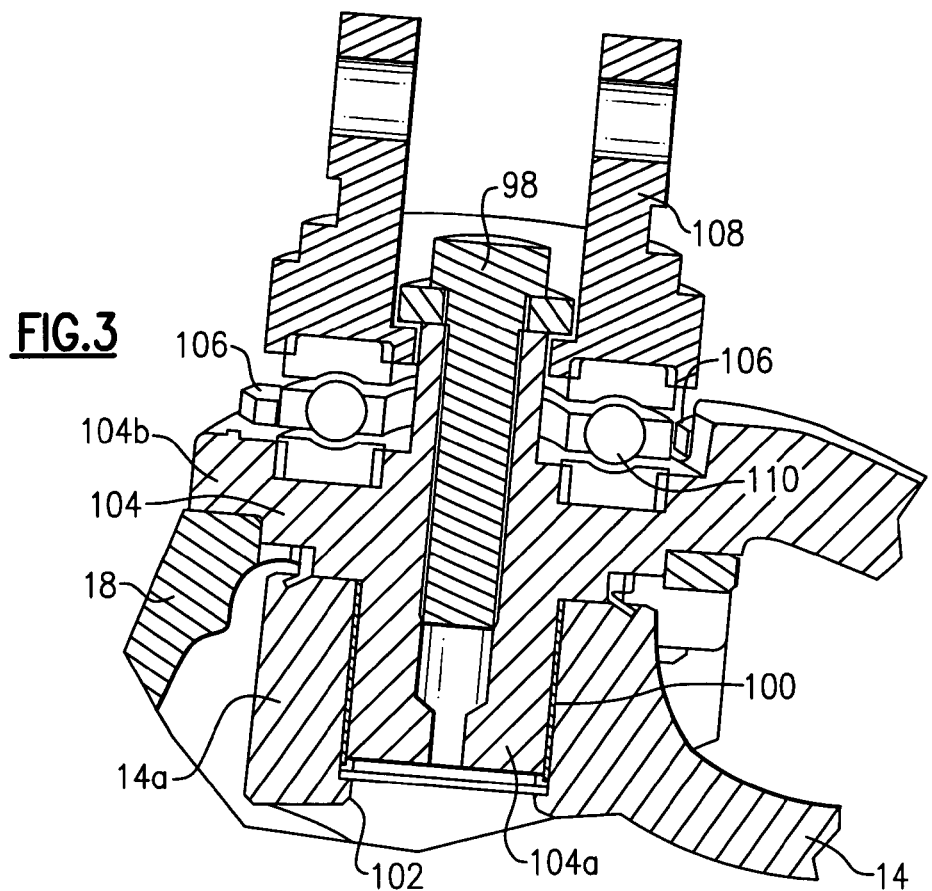
FIG. 3 is a cross-sectional view of another embodiment of a king pin mounting configuration.

Another example of a king pin mounting configuration is shown in FIG. 3. In this example, a bushing 100 is installed within a socket 102 of the upper boss 14a of the axle housing 14 such that a king pin 104 can rotate relative to the axle housing 14. The king pin 104 includes a first portion 104a that is received within the socket 102 and a second portion 104b that is bolted to the knuckle 18 with fasteners 106. Other attachment methods could also be used. The second portion 104b forms a suspension mount portion.

A suspension component bracket 108 is mounted to this suspension mount portion via a bearing assembly 110. A suspension component, such as a shock absorber 62 (FIG. 1), is then mounted to the suspension component bracket 108.

The bearing assembly 110 allows relative rotation between the king pin 104 and the suspension component bracket 108. This relative rotation is independent from the relative rotation between the king pin 104 and axle housing 14. An attachment member 98 is used to clamp the suspension component bracket 108 to the king pin 104 but still allows the bracket 108 to rotate relative to the king pin 104.

Figure 4:
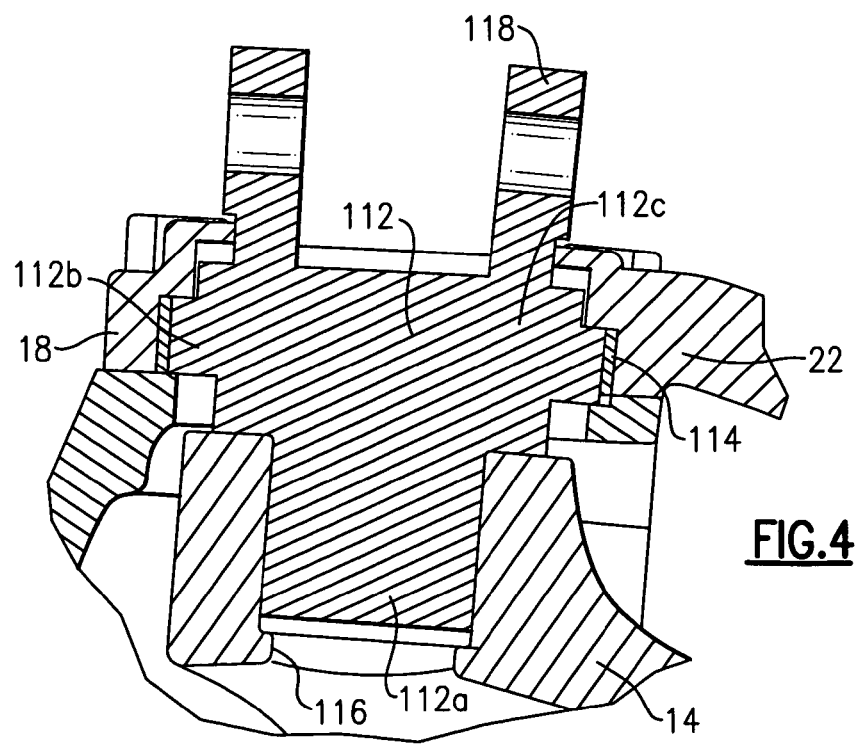
FIG. 4 is a cross-sectional view of another embodiment of a king pin mounting configuration.

Another example of a king pin mounting configuration is shown in FIG. 4. In this example, a king pin 112 is mounted to the knuckle 18 in a manner similar to that of FIG. 2. A bushing 114 is located within the upper boss 22 of the knuckle 18. The king pin 112 includes a first portion 112a that is pressed into a socket 116 of the axle housing 14 and a second portion 112b that is pressed into the bushing 114. The king pin 112 also includes a suspension mount portion 112c for attachment to a suspension component such as the shock absorber 62 shown in FIG. 1.

In this example, the press-fit attachment is sufficient to secure the king pin 112 to the axle housing 14 and knuckle 18 such that an additional attachment member is not necessary. Also in this example, a suspension component bracket 118 is integrally formed as one-piece with the suspension mount portion 112c, however, this bracket 118 could also be a separate piece.

Figure 5A:
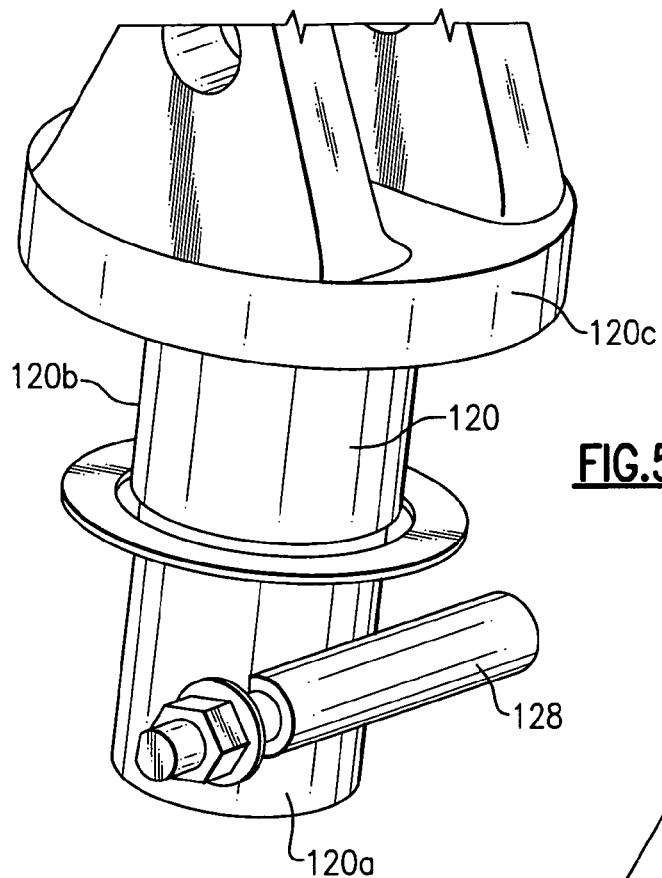
FIG. 5A is a perspective view of another embodiment of a king pin mounting configuration.
Figure 5B:
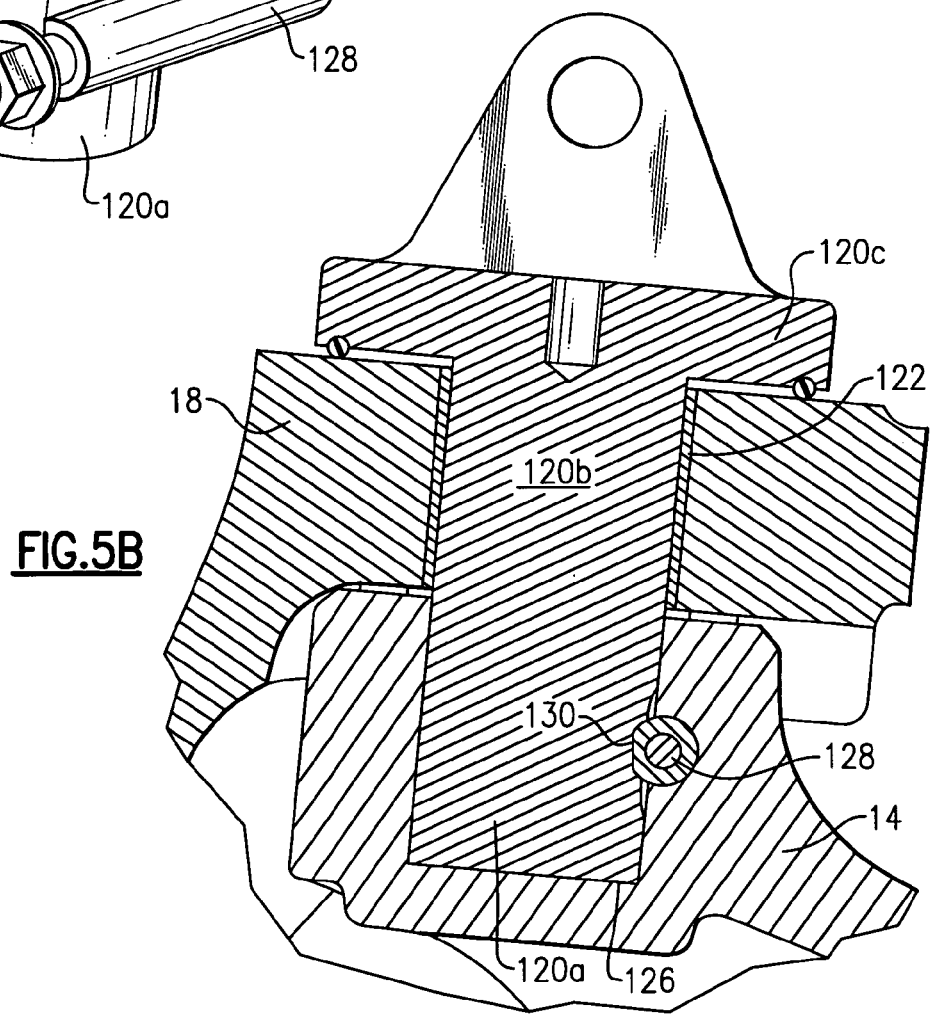
FIG. 5B is a cross-sectional view of FIG. 5A.

Another example of a king pin mounting configuration is shown in FIGS. 5A and 5B. In this example, a king pin 120 is mounted to the knuckle 18 with a bushing 122 in a manner similar to that of FIG. 2. The king pin 120 includes a first portion 120a that is received within a socket 126 of the axle housing 14 and second portion 120b that is received within the bushing 122. A suspension mount portion 120c is configured to receive a suspension component, such as the shock absorber 62 (FIG. 1).

An anti-rotation member 128 is used to prevent rotation of the king pin 120 relative to the axle housing 14. The first portion 120a of the king pin 120 is received within the socket 126 in a loose fit. The first portion 120a includes a notch 130. The anti-rotation member 128, which in this example comprises a dowel or fastener, is received within the notch 130 to prevent relative rotation. Other types of anti-rotation members could also be used.

Figure 6:
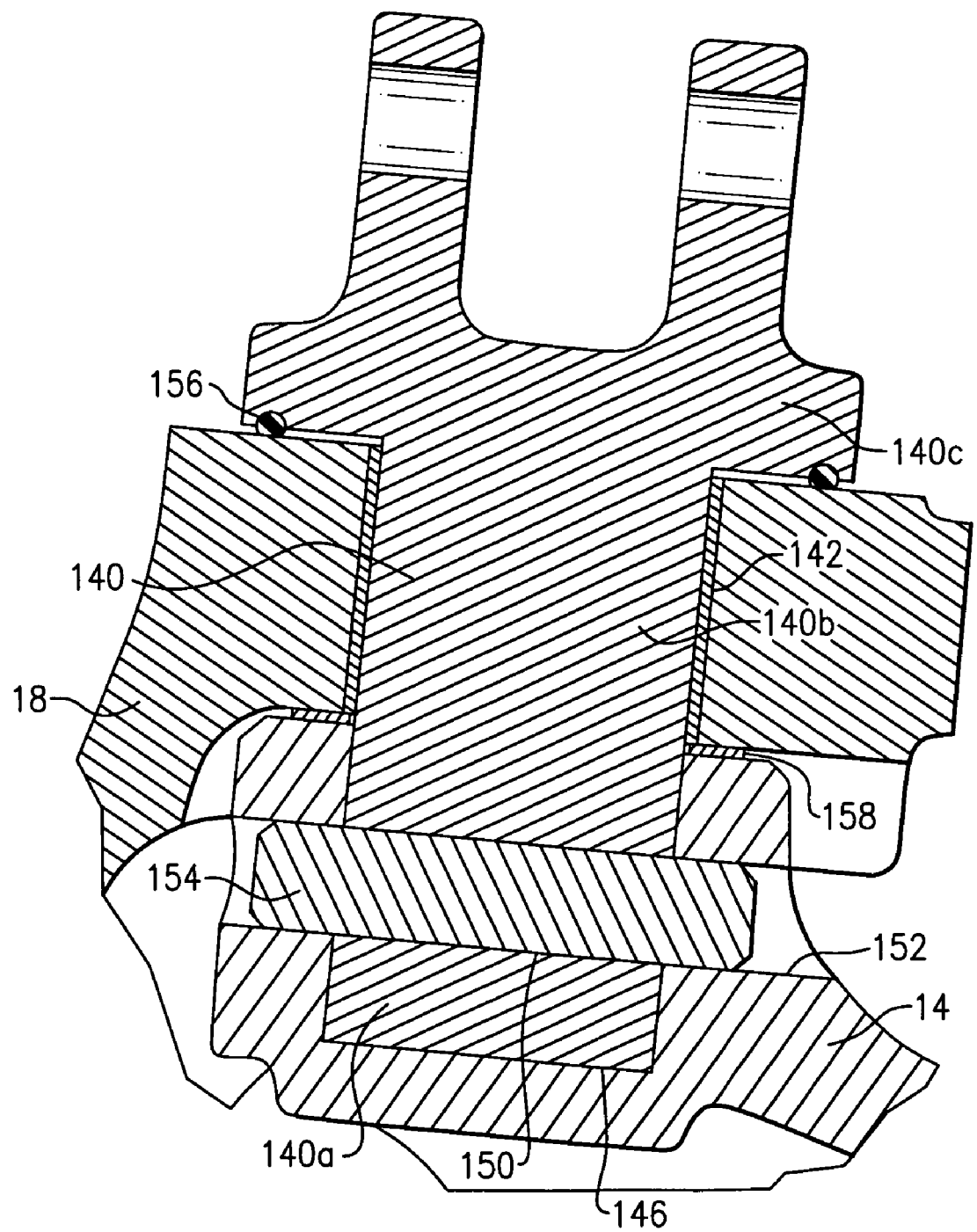
FIG. 6 is a cross-sectional view of another embodiment of a king pin mounting configuration.

Another example of a king pin mounting configuration is shown in FIG. 6. In this example, a king pin 140 is mounted to the knuckle 18 with a bushing 142 in a manner similar to that of FIG. 2. The king pin 120 includes a first portion 140a that is received within a socket 146 of the axle housing 14 and second portion 140b that is received within the bushing 142. A suspension mount portion 140c is configured to receive a suspension component, such as the shock absorber 62 (FIG. 1).

The first portion 140a of the king pin 140 includes a first transversely extending bore 150 that is aligned with a second transversely extending bore 152 formed in the axle housing 14. A dowel or fastener 154 is received within the bores 150, 152 to secure the king pin 140 to the axle housing 14 such that the king pin 140 cannot rotate relative to the axle housing 14. An o-ring 156 is positioned between the suspension mount portion 140c and the knuckle 18. This o-ring 156 could also be used in the other embodiments. Shims 158 are positioned between the knuckle 18 and the axle housing 14. These shims 158 could also be used in the other embodiments.

By mounting the king pin 20 such that the knuckle 18 can rotate relative to the king pin 20, and by mounting the shock absorber 62 directly to the king pin 20, loading experienced by the shock absorber is significantly reduced. This unique mounting configuration reduces a moment arm on the axle housing to allow for a smaller axle housing. Further, mounting the shock absorber to the king pin moves the shock absorber further outboard than traditional mounting, which results in greater wheel travel.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A king pin assembly for a steer axle comprising:
   a single-piece pin having a cylindrical body portion and a suspension mount portion, said cylindrical body portion being defined by a first diameter and being adapted for attachment to an axle housing, and said suspension mount portion being integrally formed as one piece with said cylindrical body portion and extending outwardly relative to an axis defined by said cylindrical body portion, said suspension mount portion comprising an enlarged head portion having second diameter greater than said first diameter, and wherein said suspension mount portion is adapted for attachment to a suspension component; and
   wherein said cylindrical body portion has an upper end and a lower end, and wherein said cylindrical body portion is received within an upper boss of a steering knuckle and is received within an associated upper boss of said axle housing such that said lower end does not extend below said upper boss of the axle housing.

2. The king pin assembly according to claim 1 wherein said cylindrical body portion includes a center bore for receiving an attachment member to secure said pin to the axle housing.

3. The king pin assembly according to claim 2 wherein said attachment member comprises a fastener for fixing said pin to the axle housing such that, when fixed, said pin will not rotate relative to said axle housing.

4. The king pin assembly according to claim 1 including a bushing mounted to said exterior surface that allows the steering knuckle to rotate relative to said pin.

5. The king pin assembly according to claim 1 wherein said suspension mount portion comprises an ear extension that is integrally formed as one-piece as part of said upper end of said cylindrical body portion.

6. The king pin assembly according to claim 1 wherein the suspension component comprises a shock absorber that is mounted directly to said enlarged head portion of said pin.

7. A steer axle assembly comprising:
   a king pin having a cylindrical body portion and a suspension mount formed about an upper end of said cylindrical body portion, said king pin extending from said upper end to a lower end;
   a knuckle mounted for rotation relative to said king pin, said knuckle having an upper knuckle boss to receive said king pin and a lower knuckle boss adapted to receive a separate king pin;
   an axle housing fixed to said king pin, said axle housing including an upper axle boss and a lower axle boss, and wherein said upper end of said king pin is received within said upper knuckle boss and said lower end of said king pin is received within said upper axle boss; and
   a suspension component mounted to said suspension mount of said king pin.

8. The steer axle assembly according to claim 7 including a bushing mounted within said upper knuckle boss of said knuckle with an exterior surface of said cylindrical body portion directly engaging said bushing to allow said knuckle to rotate relative to said king pin.

9. The steer axle assembly according to claim 7 wherein said lower end of said king pin is pressed into said upper axle boss of said axle housing and wherein said cylindrical body portion is defined by a first diameter and wherein said suspension mount includes an ear extension formed as one-piece with said king pin and that extends outwardly relative to said upper end portion of said cylindrical body portion, said suspension mount portion being defined by a second diameter greater than said first diameter.

10. The steer axle assembly according to claim 9 including a central bore extending from said upper end of said king pin through said lower end, and including a fastener that is received within said central bore to fix said king pin to said axle housing.

11. The steer axle assembly according to claim 7 including a bearing assembly positioned between said suspension mount and said suspension component such that said suspension component is rotatable relative to said king pin independently from rotation between said knuckle and said king pin.

12. The steer axle assembly according to claim 7 wherein said knuckle is rotatable about an axis and wherein said kin pin includes a bore extending transversely to said axis, said bore receiving an attachment member that prevents relative rotation between said king pin and said axle housing.

13. The steer axle assembly according to claim 7 wherein said king pin includes a notch formed on an exterior surface of said cylindrical body portion, and including an anti-rotation feature received in said notch to prevent relative rotation between said king pin and said axle housing.

14. The steer axle assembly according to claim 7 wherein said king pin and said suspension mount portion are integrally formed together as a single-piece component, and wherein said suspension component comprises a shock absorber that is mounted directly to said king pin.

15. The steer axle assembly according to claim 7 wherein said king pin is mounted to said axle housing with a press fit, said press fit forming the only attachment interface between said king pin and said axle housing.

16. The steer axle assembly according to claim 7 wherein said suspension component is concentric with said king pin.

17. The steer axle assembly according to claim 7 wherein said lower end of said king pin does not extend below said upper axle boss of said axle housing.

18. A method of attaching a suspension component to an axle component comprising the step(s) of:
    mounting a suspension component directly to a suspension mount portion integrally formed as part of a single-piece king pin;
    attaching an upper boss of a knuckle to an upper boss of an axle housing with the king pin; and
    attaching a lower boss of the knuckle to a lower boss of the axle housing with another king pin such that the knuckle can rotate relative to the king pin and such that there is no relative rotation between the king pin and the axle housing.

19. The method according to claim 18 including providing the king pin with a cylindrical body having an outer peripheral surface, and installing a bushing within the upper boss of the knuckle to engage the outer peripheral surface such that the upper boss of the knuckle can rotate relative to the king pin.

20. The method according to claim 18 including providing the king pin with a cylindrical body defined by a first diameter and having an upper end, a lower end, and a center bore extending from the upper end to the lower end, and with the suspension mount portion including an ear extension integrally formed about an upper end of the cylindrical body, the suspension mount portion being defined by a second diameter that is greater than the first diameter, and including installing a fastener within the center bore to secure the king pin to the upper boss of the axle housing, and attaching the suspension component to the ear extension.

21. A method of attaching a suspension component to an axle component comprising the step(s) of:
- mounting a suspension component directly to a suspension mount portion integrally formed as part of a single-piece king pin, wherein the suspension component comprises a shock absorber; and
- mounting the shock absorber directly to an upper surface of the suspension mount portion of the king pin such that the shock absorber is concentric with the kin pin.

22. A king pin assembly for a steer axle comprising:
- a single-piece pin having a cylindrical body portion and a suspension mount portion, said cylindrical body portion being defined by a first diameter and being adapted for attachment to an axle housing, and said suspension mount portion being integrally formed as one piece with said cylindrical body portion and extending outwardly relative to an axis defined by said cylindrical body portion, said suspension mount portion comprising an enlarged head portion having second diameter greater than said first diameter, and wherein said suspension mount portion is adapted for attachment to a suspension component that comprises a shock absorber that is mounted directly to said enlarged head portion of said pin, and wherein said shock absorber is concentric with said cylindrical body portion.

23. A method of attaching a suspension component to an axle component comprising the step(s) of:
- mounting a suspension component directly to a suspension mount portion integrally formed as part of a single-piece king pin, and wherein the king pin includes an upper end and a lower end;
- installing the upper end of the king pin in an upper boss of a knuckle; and
- installing the lower end of the king pin in an upper boss of an axle housing such that the lower end does not extend below the upper boss of the axle housing.

* * * * *

UNITED STATES PATENT AND TRADEMARK OFFICE
CERTIFICATE OF CORRECTION

PATENT NO.      : 7,614,629 B2                                                             Page 1 of 1
APPLICATION NO. : 11/545022
DATED           : November 10, 2009
INVENTOR(S)     : Dinakaran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this

Nineteenth Day of October, 2010

David J. Kappos
*Director of the United States Patent and Trademark Office*